United States Patent
Apuri et al.

(10) Patent No.: US 12,423,281 B2
(45) Date of Patent: Sep. 23, 2025

(54) SYSTEM AND METHOD FOR DETERMINING DATA QUALITY DURING DATA PROCESSING

(71) Applicant: BANK OF AMERICA CORPORATION, Charlotte, NC (US)

(72) Inventors: Vivekanand Apuri, Telangana (IN); Naresh Dolani, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/368,334

(22) Filed: Sep. 14, 2023

(65) Prior Publication Data
US 2025/0094394 A1   Mar. 20, 2025

(51) Int. Cl.
G06F 16/00 (2019.01)
G06F 16/215 (2019.01)
G06F 16/2457 (2019.01)

(52) U.S. Cl.
CPC ...... *G06F 16/215* (2019.01); *G06F 16/24578* (2019.01)

(58) Field of Classification Search
None
See application file for complete search history.

(56) References Cited

U.S. PATENT DOCUMENTS

2010/0005346 A1*   1/2010   Hamlescher .......... G06Q 10/06
                                                            706/50

\* cited by examiner

*Primary Examiner* — Anhtai V Tran
(74) *Attorney, Agent, or Firm* — Moore & Van Allen PLLC; Nicholas C. Russell (57) ABSTRACT

Systems, computer program products, and methods for determining data quality during data processing are provided. The method includes receiving data quality rule information relating to a plurality of data quality rules executed on a network. The data quality rule information includes at least one data quality metric for each data quality rule. The method also includes comparing one or more of the at least one data quality metric for each of the plurality of data quality rules. The method further includes determining a data quality rule ranking for each of the plurality of data quality rules. The method still further includes receiving one or more processes to be executed on the network. The method also includes determining one or more executed data quality rules to be executed on data associated with the one or more processes based on the data quality rule ranking.

17 Claims, 6 Drawing Sheets

SYSTEM AND METHOD FOR DETERMINING DATA QUALITY DURING DATA PROCESSING

TECHNOLOGICAL FIELD

Example embodiments of the present disclosure relate generally to data processing and, more particularly, to determining data quality during data processing.

BACKGROUND

Large scale data processing introduces additional potential for low quality data. However, execution of data quality rules is often burdensome on network capabilities. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for determining data quality during data processing is provided. The system includes at least one non-transitory storage device containing instructions and at least one processing device coupled to the at least one non-transitory storage device. The at least one processing device, upon execution of the instructions, is configured to receive data quality rule information relating to a plurality of data quality rules executed on a network. The data quality rule information includes at least one data quality metric for each of the plurality of data quality rules. The plurality of data quality rules includes at least a first data quality rule and a second data quality rule. The at least one processing device, upon execution of the instructions, is also configured to compare one or more of the at least one data quality metric for each of the plurality of data quality rules. One or more common data quality metrics is compared for each of the plurality of data quality rules. The at least one processing device, upon execution of the instructions, is further configured to determine a data quality rule ranking for each of the plurality of data quality rules based on the comparison of one or more of the at least one data quality metric. The at least one processing device, upon execution of the instructions, is still further configured to receive one or more processes to be executed on the network. The at least one processing device, upon execution of the instructions, is also configured to determine one or more executed data quality rules of the plurality of data quality rules to be executed on data associated with the one or more processes based on the data quality rule ranking.

In various embodiments, the at least one processing device, upon execution of the instructions, is configured to cause a ranking report to be generated based on the data quality rule ranking with the ranking report including the data quality rule ranking and the at least one data quality metric.

In various embodiments, the at least one processing device, upon execution of the instructions, is configured to update the data quality rule ranking based on one or more of the plurality of data quality rules being executed on the network.

In various embodiments, the at least one processing device, upon execution of the instructions, is configured to update the data quality rule ranking based on a query received from an end-point device associated with the network.

In various embodiments, the at least one processing device, upon execution of the instructions, is configured to determine one or more preferred metrics for the one or more processes to be executed on the network with the data quality rule ranking being updated based on the one or more preferred metrics, and the one or more preferred metrics being determined based on the one or more processes to be executed.

In various embodiments, the at least one processing device, upon execution of the instructions, is configured to cause an execution of the one or more executed data quality rules on data associated with the one or more processes upon execution of the one or more process. In various embodiments, the at least one processing device, upon execution of the instructions, is configured to cause a rendering of information relating to the execution of the one or more executed data quality rules.

In another example embodiment, a computer program product for determining data quality during data processing is provided. The computer program product includes at least one non-transitory computer-readable medium having computer-readable program code portions embodied therein. The computer-readable program code portions include one or more executable portions configured to receive data quality rule information relating to a plurality of data quality rules executed on a network. The data quality rule information includes at least one data quality metric for each of the plurality of data quality rules. The plurality of data quality rules includes at least a first data quality rule and a second data quality rule. The computer-readable program code portions include one or more executable portions also configured to compare one or more of the at least one data quality metric for each of the plurality of data quality rules. One or more common data quality metrics is compared for each of the plurality of data quality rules. The computer-readable program code portions include one or more executable portions further configured to determine a data quality rule ranking for each of the plurality of data quality rules based on the comparison of one or more of the at least one data quality metric. The computer-readable program code portions include one or more executable portions still further configured to receive one or more processes to be executed on the network. The computer-readable program code portions include one or more executable portions also configured to determine one or more executed data quality rules of the plurality of data quality rules to be executed on data associated with the one or more processes based on the data quality rule ranking.

In various embodiments, the computer-readable program code portions include one or more executable portions are also configured to cause a ranking report to be generated based on the data quality rule ranking with the ranking report including the data quality rule ranking and the at least one data quality metric.

In various embodiments, the computer-readable program code portions include one or more executable portions are also configured to update the data quality rule ranking based on one or more of the plurality of data quality rules being executed on the network.

In various embodiments, the computer-readable program code portions include one or more executable portions are also configured to update the data quality rule ranking based on a query received from an end-point device associated with the network.

In various embodiments, the computer-readable program code portions include one or more executable portions are also configured to determine one or more preferred metrics for the one or more processes to be executed on the network with the data quality rule ranking being updated based on the one or more preferred metrics, and the one or more preferred metrics being determined based on the one or more processes to be executed.

In various embodiments, the computer-readable program code portions include one or more executable portions are also configured to cause an execution of the one or more executed data quality rules on data associated with the one or more processes upon execution of the one or more process. In various embodiments, the computer-readable program code portions include one or more executable portions are also configured to cause a rendering of information relating to the execution of the one or more executed data quality rules.

In still another example embodiment, a method for determining data quality during data processing is provided. The method includes receiving data quality rule information relating to a plurality of data quality rules executed on a network. The data quality rule information includes at least one data quality metric for each of the plurality of data quality rules. The plurality of data quality rules includes at least a first data quality rule and a second data quality rule. The method also includes comparing one or more of the at least one data quality metric for each of the plurality of data quality rules. One or more common data quality metrics is compared for each of the plurality of data quality rules. The method further includes determining a data quality rule ranking for each of the plurality of data quality rules based on the comparison of one or more of the at least one data quality metric. The method still further includes receiving one or more processes to be executed on the network. The method also includes determining one or more executed data quality rules of the plurality of data quality rules to be executed on data associated with the one or more processes based on the data quality rule ranking.

In various embodiments, the method also includes causing a ranking report to be generated based on the data quality rule ranking with the ranking report including the data quality rule ranking and the at least one data quality metric.

In various embodiments, the method also includes updating the data quality rule ranking based on one or more of the plurality of data quality rules being executed on the network.

In various embodiments, the method also includes updating the data quality rule ranking based on a query received from an end-point device associated with the network.

In various embodiments, the method also includes determining one or more preferred metrics for the one or more processes to be executed on the network with the data quality rule ranking being updated based on the one or more preferred metrics, and the one or more preferred metrics being determined based on the one or more processes to be executed.

In various embodiments, the method also includes causing an execution of the one or more executed data quality rules on data associated with the one or more processes upon execution of the one or more process. In various embodiments, the method also includes causing a rendering of information relating to the execution of the one or more executed data quality rules.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Large scale data processing introduces additional potential for low quality data. However, execution of data quality rules is often burdensome on network capabilities. Data quality rules are not equally effective and/or efficient, such that having an inefficient selection of data quality rules can create a large strain on a network. Additionally, each process on a network is different, generating different data sets that also respond differently to executed data quality rules. As such, there is no way to standardize data quality rules to ensure a high quality of data, while being as efficient as possible. The issue of correct data quality rule selection has been made even more important as data size of processed data has increased. With the increase in artificial intelligence, a need for high quality data is increased. In order to be both fast and effective, artificial intelligence engines require data that can be verified without delaying processing.

Various embodiments of the present disclosure allow for determining data quality during data processing. The system creates data quality rule rankings that can be used to determine data quality rules to be used for data associated with one or more processes on the network. To do this, the system receives data quality rule information relating to a plurality of data quality rules. The data quality rule information may include data quality rule metadata. As such, the system compares common data quality metrics between the data quality rules, such as number of valid data quality rule executions, number of unsuccessful data quality rule executions, time of execution, number of executions over a period of time), amount of data processed during a data quality rule execution, number of failed executions over a period of time, amount of processing power used during execution, domain of data quality rule, number of times data quality rules meet a break threshold, and/or the like.

The comparison is used to determine a data quality rule ranking using machine learning model(s) (e.g., a learn to rank machine learning model). The different data quality metrics may be weighted in the determination of the data quality rule ranking. The data quality rule ranking can be used and/or updated to determine data quality rules to execute on data associated with one or more processes to be executed on a network. The system may generate ranking reports associated with the data quality rule rankings and/or cause execution of certain data quality rules on data based on the data quality rule rankings.

Figure 1A:
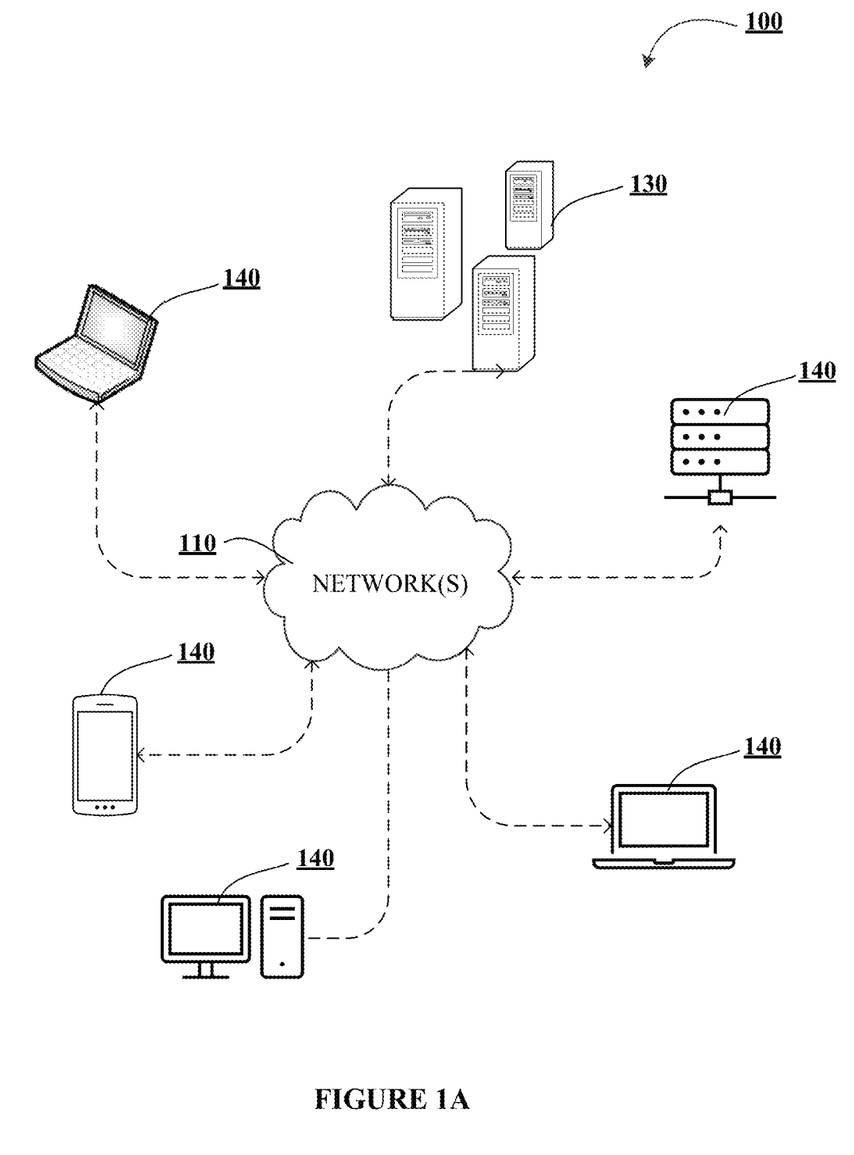
FIGS. 1A-1C illustrates technical components of an example distributed computing environment for determining data quality during data processing, in accordance with various embodiments of the present disclosure.
Figure 1B:
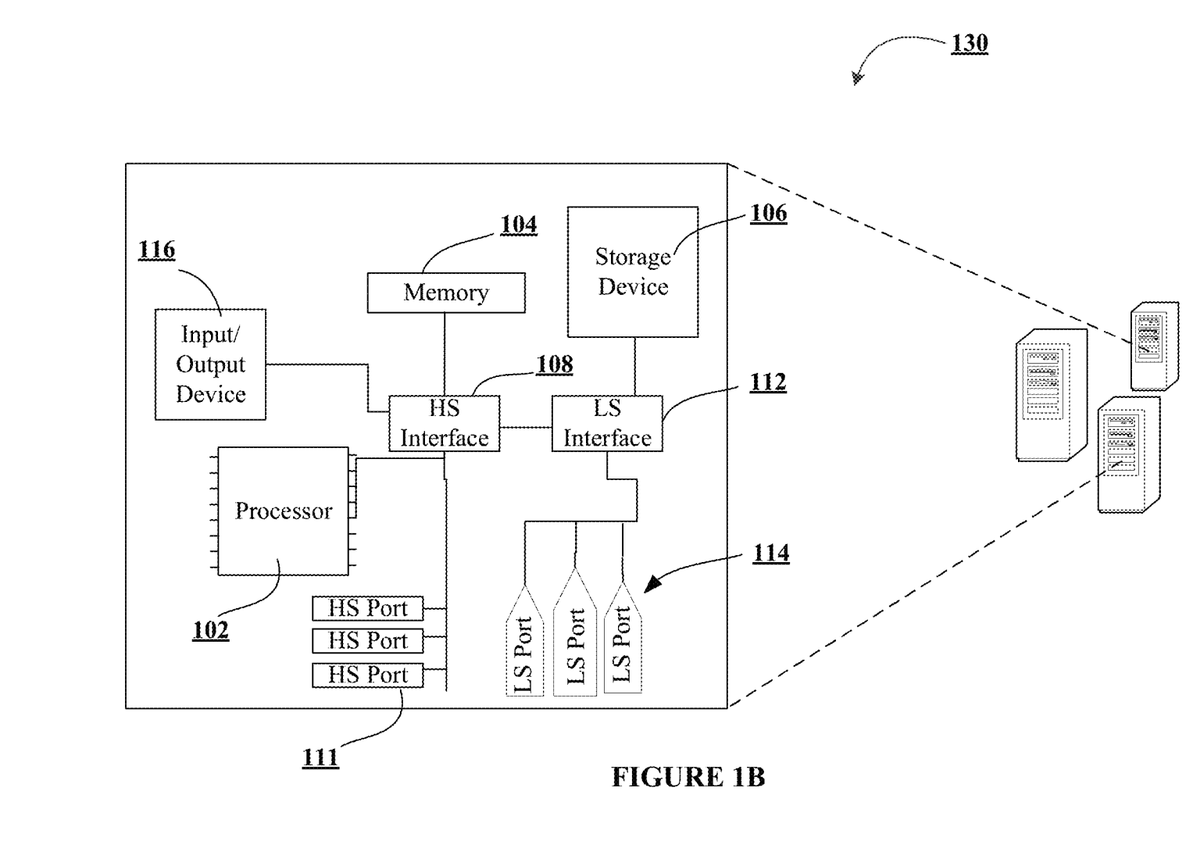
Figure 1C:
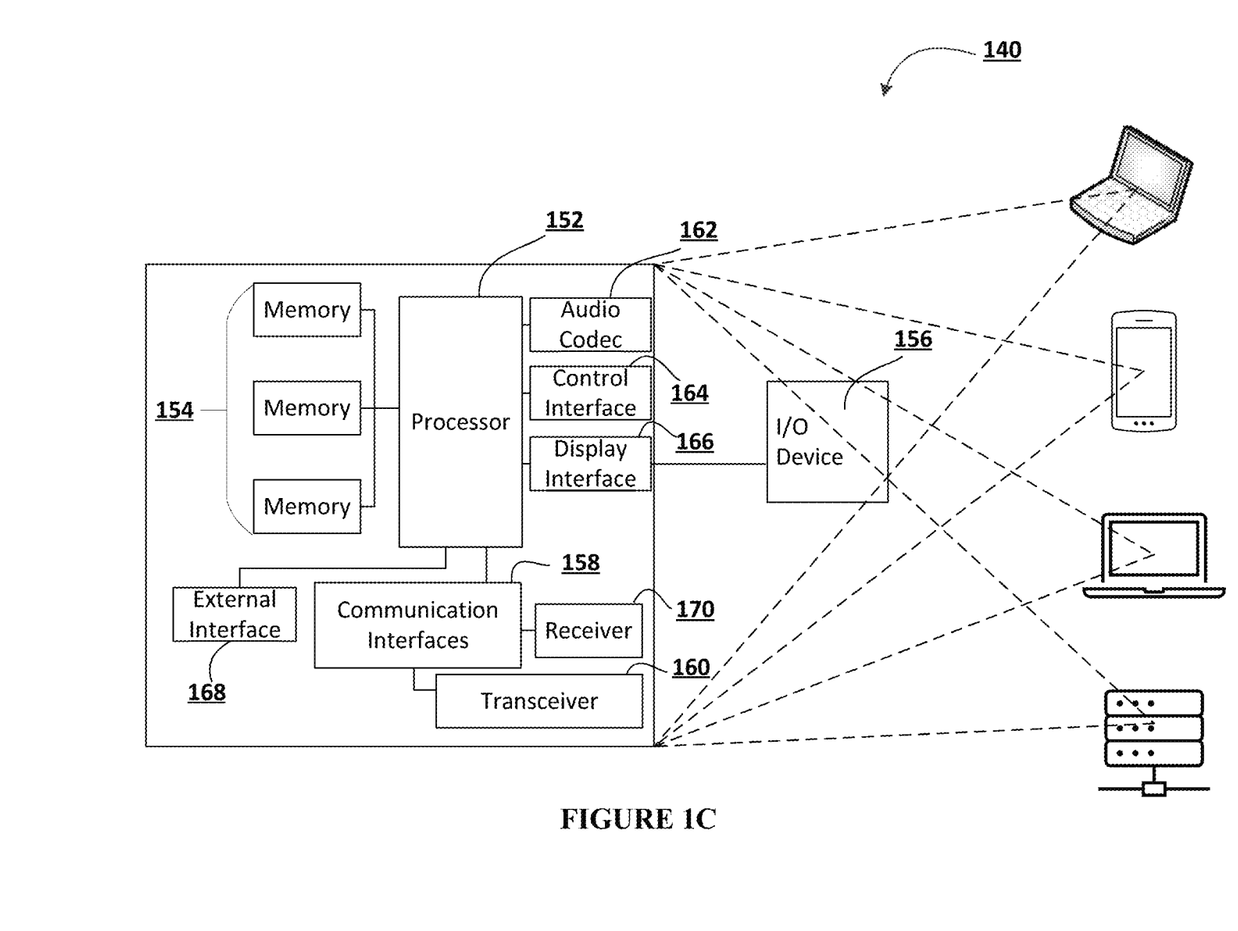

FIGS. 1A-1C illustrate technical components of an exemplary distributed computing environment for determining data quality during data processing, in accordance with various embodiments of the disclosure. As shown in FIG. 1A, the distributed computing environment 100 contemplated herein may include a system 130 (e.g., a data quality rule ranking device), an end-point device(s) 140, and one or more networks 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, satellite network, cellular network, and/or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 106. Each of the components 102, 104, 106 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through at least one of communication interfaces 158, which may include digital signal processing circuitry where necessary. Communication interfaces 158 may provide for communications under various modes or protocols, such as the Internet Protocol (IP) suite (commonly known as TCP/IP). Protocols in the IP suite define end-to-end data handling methods for everything from packetizing, addressing, and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interfaces 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130. The end-point device(s) 140 may include a communication interface that is configured to operate with a satellite network.

In various embodiments, the end-point device(s) 140 may have multiple communication interfaces that are configured to operate using the various communication methods discussed herein. For example, an end-point device 140 may have a cellular network communication interface (e.g., a communication interface that provides for communication under various telecommunications standards) and a satellite network communication interface (e.g., a communication interface that provides for communication via a satellite network). Various other communication interfaces may also be provided by the end-point device (e.g., an end-point device may be capable of communicating via a cellular network, a satellite network, and/or a wi-fi connection). Various communication interfaces may share components with other communication interfaces in the given end-point device.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
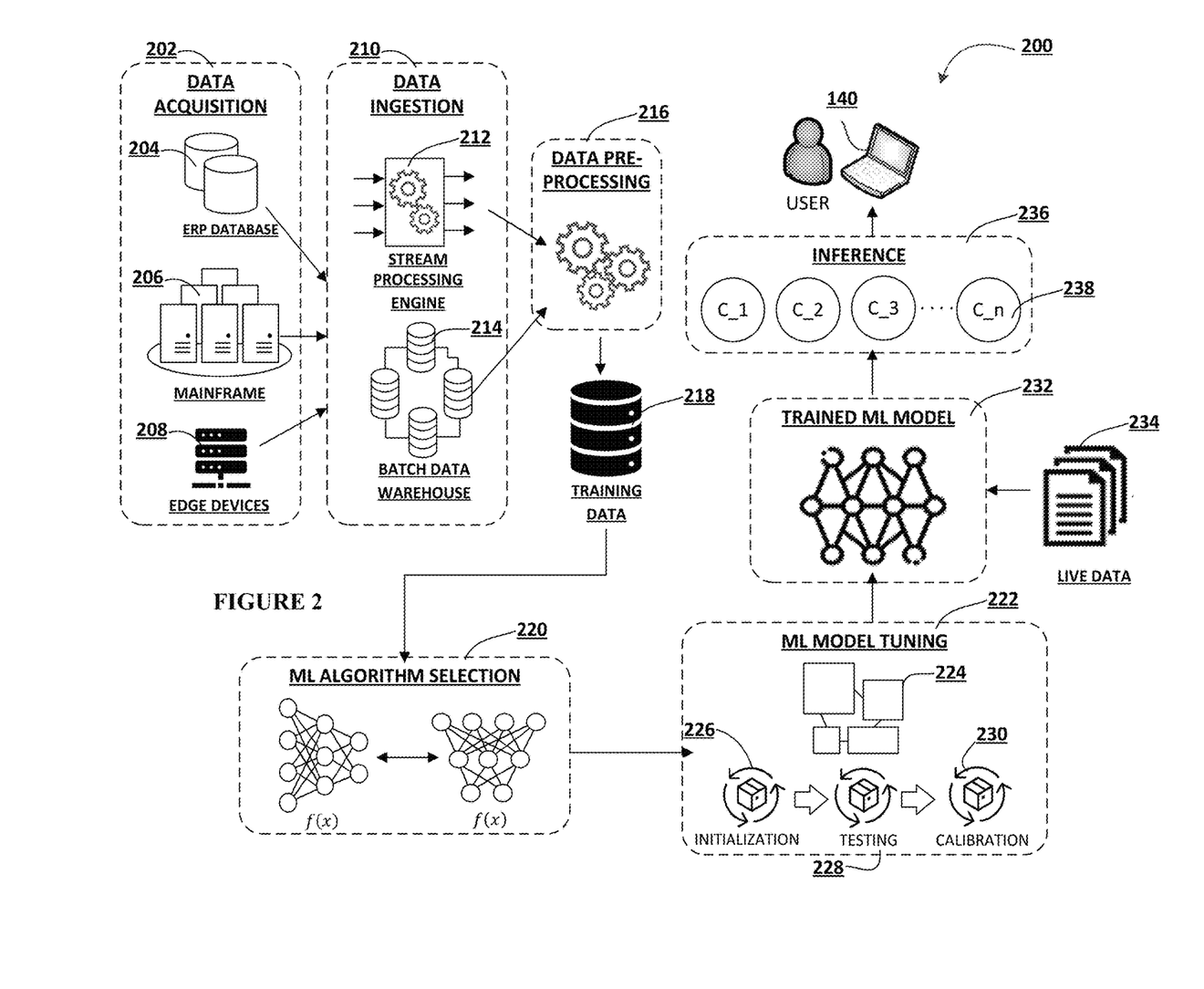
FIG. 2 illustrates an example machine learning (ML) subsystem architecture used to determine data quality during data processing, in accordance with various embodiments of the present disclosure.

FIG. 2 illustrates an example machine learning (ML) architecture 200, in accordance with an embodiment of the present disclosure. The ML subsystem architecture may be part of the components of the environment 100 (e.g., system 130). The ML subsystem architecture is used to determine data quality during data processing as discussed below in reference to FIGS. 3A and 3B. Namely, the ML subsystem architecture may be used to train the system to rank data quality rules and determine data quality rules to use on one or more processes based on the data quality rule ranking.

The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

Figure 3A:
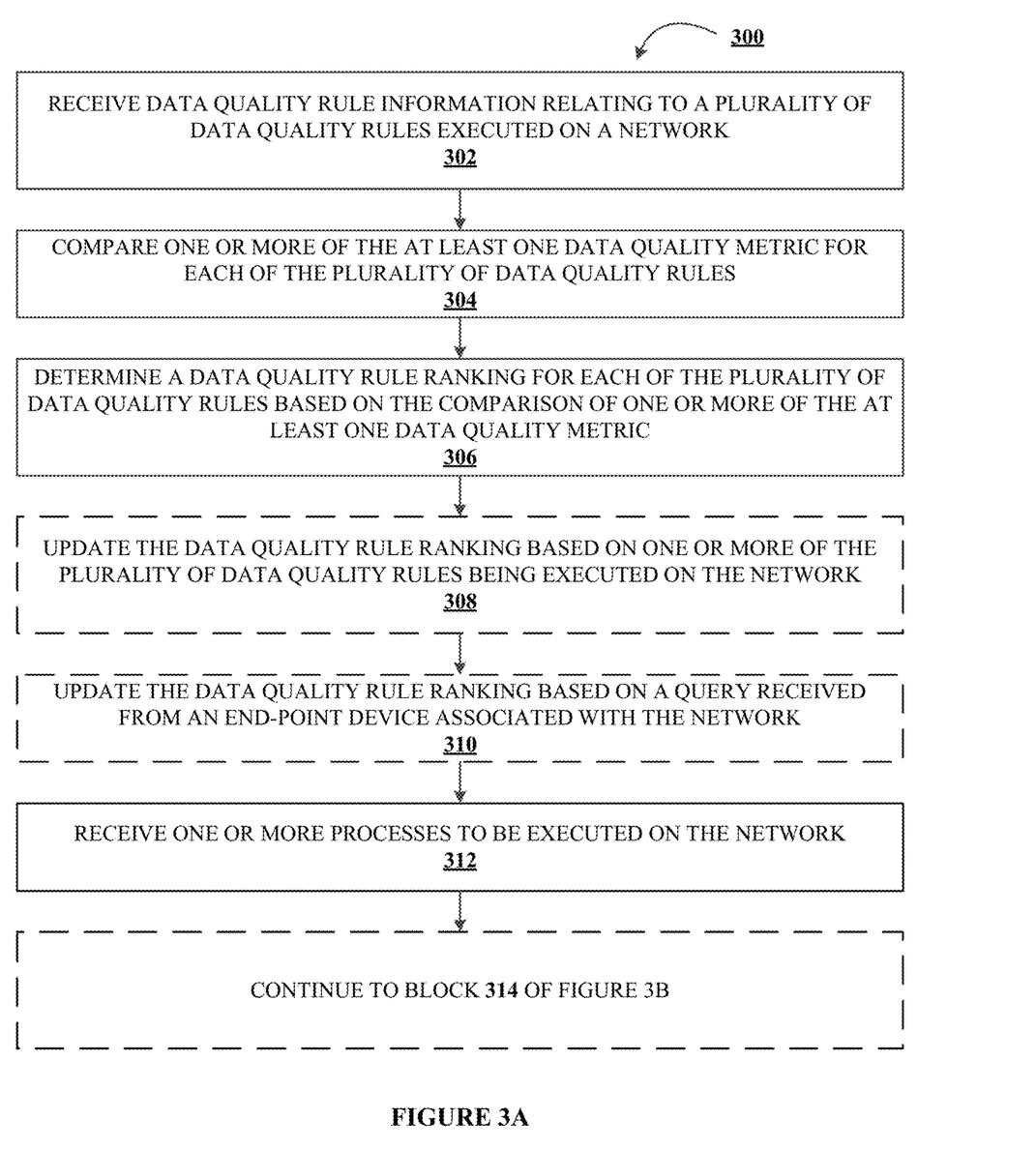
FIGS. 3A and 3B illustrate a process flow for determining data quality during data processing, in accordance with various embodiments of the present disclosure.
Figure 3B:
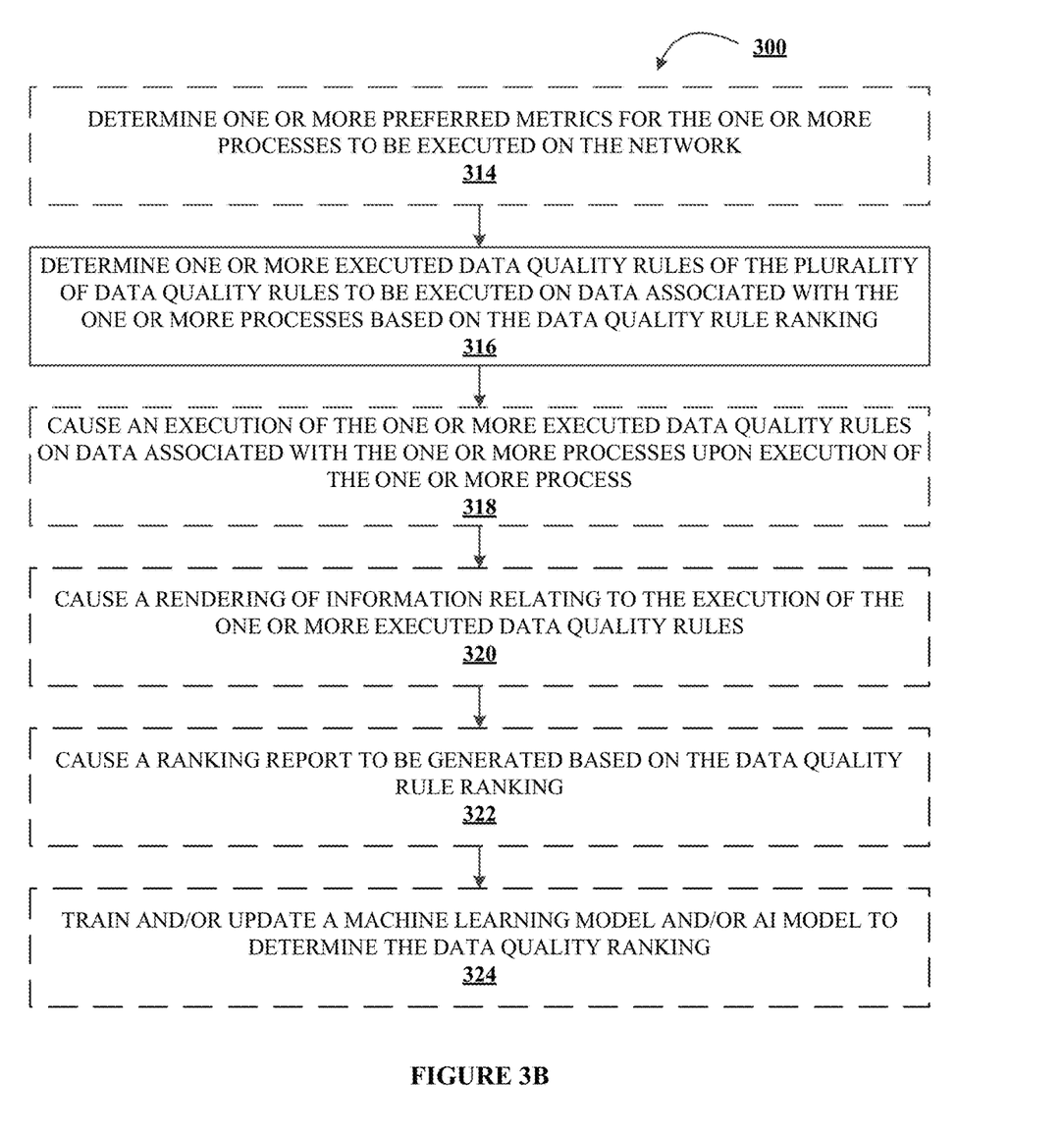

FIGS. 3A and 3B include a flow chart 300 that illustrates an example method for determining data quality during data processing. The method may be carried out by various components of the distributed computing environment 100 discussed herein (e.g., the system 130, one or more endpoint devices 140, etc.). An example system may include at least one non-transitory storage device and at least one processing device coupled to the at least one non-transitory storage device. In such an embodiment, the at least one processing device is configured to carry out the method discussed herein. A method of various embodiments may include any combination or subset of the features discussed herein.

Referring now to Block 302 of FIG. 3A, the method includes receiving data quality rule information relating to a plurality of data quality rules executed on a network. The data quality rule information may include data quality rule metadata (e.g., metadata from previous execution of the data quality rule).

Any number of data quality rules may be used for the operations herein (e.g., a first data quality rule, a second data quality rule, a third data quality rule, and/or the like). A data quality rule may be any data quality rule that has been or is capable of being performed on the network. The data quality rule need not necessarily have been executed on the type of processes to be executed (e.g., received in Block 312).

A data quality rule may include any type of data quality rule, such as a data quality rules relating to accuracy, completeness, consistency, timeliness, validity, uniqueness, and/or the like. Accuracy-based data quality rules may measure how the values of data compare to data that is known to be correct, completeness-based data quality rules may determine whether the data includes information for all required fields, consistency-based data quality rules may determine whether data conflicts with the same or similar data received from a different source, timeliness-based data quality rules may determine the freshness of the data and/or how often data is updated, validity-based data quality rules may determine whether data conforms to formatting rules and parameters, and uniqueness-based data quality rules may determines whether the data exists elsewhere (e.g., the data has been received from a different source).

In various embodiments, the data quality rule information includes at least one data quality metric for each of the plurality of data quality rules. The at least one data quality metric may be determined from one or more previous execution of the given data quality rule. In various embodiments, one or more predefined data quality rules may be used (e.g., the data quality rule may be used in various data sets).

Various types of data issues may be detected using data quality rules. Example data quality issues include inaccurate data, missing data, duplicated data, variable measuring data (e.g., data with different measuring units within the same data set or within other data sets), variable formatting and patterns, outdated information, incorrect domain, inconsistency with data, irrelevant data, and/or the like. Various data quality rules may be used to detect such data issues. Additional data issues may be monitored via different data quality rules.

Referring now to Block 304 of FIG. 3A, the method includes comparing one or more of the at least one data quality metric for each of the plurality of data quality rules. In various embodiments, common data quality metrics are compared across each of the plurality of data quality rules. A common data quality metric is a data quality metric type in which at least two of the plurality of data quality rules have in common (e.g., included in the data quality rule information received in Block 302).

Example data quality metrics include number of valid data quality rule executions, number of unsuccessful data quality rule executions, time of execution, number of executions over a period of time (e.g., number of data quality rule executions over the course of a day), amount of data processed during a data quality rule execution, number of failed executions over a period of time, amount of processing power used during execution, domain of data quality rule, number of times data quality rules meet a break threshold, and/or the like. Any number of different data quality metrics may be received. For example, the system may monitor various different data quality metrics of the system during execution of a data quality rule.

Data quality rules may be automatically designated (e.g., the amount of processing power used during execution may be regularly monitored by the system) and/or customized. For example, a user via an end-point device may input specific data quality metrics to be monitored during data quality rule execution. Such a custom data quality metric may be recorded for a specific data quality rule(s) and/or all of the data quality rules performed on the network. As such, the system may receive the customized data quality metric for one or more data quality rules in the data quality rule information.

Referring now to Block 306 of FIG. 3A, the method includes determining a data quality rule ranking for each of the plurality of data quality rules based on the comparison of one or more of the at least one data quality metric. The data quality rule ranking comprises an ordered list of at least two of the plurality of data quality rules. The data quality rule ranking may be based on at least one of the one or more common data quality metrics.

In various embodiments, the data quality rule ranking may be based on a plurality of the one or more common data quality metrics. In various embodiments, each of the common data quality metrics may be weighted. In some embodiments, the weighting for each of the data quality metrics may be equal (e.g., each data quality metric is credited the same amount as other data quality metrics). Alternatively, one or more of the common data quality metrics may be given a higher weight than other common data quality metric(s). As such, a better performance on higher weighted may cause a higher ranking in the data quality rule ranking. The weighting of the common data quality metrics may be predefined (e.g., the system may have predefined weightings for each of the data quality metrics based on a predetermined hierarchy of data quality metrics). Additionally or alternatively, a user via an end-point device may customize one or more of the weights for the data quality metrics. For example, the processes on a network may be typically more computing intensive, and as such, the amount of computing processing used by a data quality rule execution is important and may receive a higher weight.

In various embodiments, one or more of the common data quality metrics may be removed from the determination of the data quality rule rankings. For example, the weight of the given data quality metric may be set to 0. Such a removal may be automated (e.g., the system may automatically determine one or more data quality metrics are not helpful for the network) and/or manual (e.g., a user via an end-point device may select one or more data quality metrics to not be included in the determination of the data quality rule ranking).

In various embodiments, the data quality rule ranking may include multiple different rankings of the data quality rules. For example, the data quality rule ranking may include a first ranking with certain data quality metrics receiving higher weighting than other data quality metrics and a second ranking with the certain data quality metrics receiving lower or the same weighting as the other data quality metrics. The different rankings may be used differently based on the one or more processes to be executed (e.g., as discussed below in reference to Block 312). For example, in an instance in which the processes are computing usage heavy, the ranking with higher weight given to the data quality metric associated with computing usage may be used for determining the executed data quality rule(s).

In various embodiments, the data quality rule ranking may be determined using ML/AI model(s) as discussed in reference to FIG. 2. For example, the data quality rule may be determined using a learn to rank machine learning model. A learn to rank machine learning model is a class of algorithmic techniques that apply machine learning to solve ranking problems in search relevancy. The learn to rank machine learning models are designed specifically to present a list of documents that maximizes satisfaction of user using query-result approach where permutation set of results are provided based on relevancy. The learn to rank machine learning model may use input data as feature vectors which are processed using a neural network to extract relevant features with relevant scores.

Referring now to optional Block 308 of FIG. 3A, the method includes updating the data quality rule ranking based on one or more of the plurality of data quality rules being executed on the network. In various embodiments, the data quality rule ranking may be dynamic. As such, the data quality rule ranking may be updated periodically due to new information. For example, the data quality rules may be executed on the network at various times (e.g., on various different processes and/or data), such that new values for the data quality metrics may be determined and/or received by the system.

In some embodiments, the data quality rule ranking may be updated at certain intervals of time (e.g., daily, weekly, monthly, yearly, etc.), such that the system may gather information relating to the data quality rules over time and then update the data quality rule ranking at the end of the given interval of time. For example, in an instance in which the data quality rule ranking is updated weekly, the system may receive new information (e.g., new data quality rule information) that is complied and/or stored until the next time in which the data quality rule ranking is updated (e.g., at the end of the given week).

Referring now to optional Block 310 of FIG. 3A, the method includes updating the data quality rule ranking based on a query received from an end-point device associated with the network. In various embodiments, one or more queries may be received by the system (e.g., from end-point device(s)). The one or more queries may be related to the plurality of data quality rules. As such, the query may request one or more specific data quality metric receive a higher weighting.

Additionally or alternatively, the one or more queries may be a request for a certain ordering of the data quality rule ranking. For example, the query may request the top X number of data quality rules to be provided, such that only the requested number of data quality rules is provided (e.g., a user may request the top three data quality rules and the system may then provide the top three data quality rules in the data quality rule rankings to the user via the end-point device associated with the user).

In various embodiments, the system may receive one or more queries that are related to the accuracy of the data quality rules and/or the data quality rule metadata. The query may include information, such as corrections to data quality metrics, the prior accuracy of one or more data quality rules, previous data quality metric(s) for the one or more data quality rules, a ranking of data quality rules, and/or the like. As such, the query may be used to create and/or improve data quality rankings. In various embodiments, the queries may be used to train and/or update the ML/AI model(s) discussed below in reference to Block 324. The ML/AI model(s) may be trained using information from the queries to improve data quality rankings in future operations. For example, a query that includes a correction of accuracy of a data quality rule may be ingested by the ML/AI model(s) to improve future data quality rankings.

Referring now to Block 312 of FIG. 3A, the method includes receiving one or more processes to be executed on the network. Each of the one or more processes may include data (either as an input or an output) that is analyzed via one or more of the data quality rule(s). As such, the operations discussed herein may be based on the data associated with the one or more processes. As such, the one or more processes may be associated with different types of data. The type of data may be determined based on the data format, the data size, the data subject matter, and/or the like.

In various embodiments, the one or more processes may be previously executed on the network or a similar network. For example, the process(es) may be executed regularly on a different process and, as such, the data type may be known for the one or more processes. Additionally, the preferred metrics discussed below in reference to Block 314 may also be determined via the previous executions. Additionally or alternatively, the preferred metrics may be determined based on the input data into the one or more processes (e.g., the type of input data affects the preferred metrics that may be more important than other data quality metrics).

Referring now to optional Block 314 of FIG. 3B, the method includes determining one or more preferred metrics for the one or more processes to be executed on the network. A preferred metric may be any data quality metric that is determined to be more important to the one or more processes. The preferred metric may be based on the type of data associated with the one or more processes (e.g., the input and/or output data sets of the one or more processes).

In various embodiments, the preferred metric(s) may be based on previous executions of the process(es) (e.g., the system may learn via the ML/AI model(s) that one data quality metric is more important for analyzing data associated with a given process), the input data and/or output data associated with the process(es) (e.g., the data type may affect which data quality metrics are more important than other data quality rules), user defined preferred metrics (e.g., a user may know based on experience or otherwise which data quality metrics are most important for a given process), process developer defined preferred metrics (e.g., a process developer may indicate that a process uses a high amount of computing power and the amount of computing needed for the data quality rule execution may be a preferred metric), and/or the like.

In various embodiments, the data quality ranking may be updated based on the preferred metric(s). In some embodiments, the preferred metrics may be given a higher weight than other common data quality metrics. Additionally or alternatively, the data quality rule ranking may be updated to only consider the preferred metric(s) (e.g., the weight of non-preferred common data quality metrics may be set to zero and do not affect the data quality rule ranking).

Referring now to Block 316 of FIG. 3B, the method includes determining one or more executed data quality rules of the plurality of data quality rules to be executed on data associated with the one or more processes based on the data quality rule ranking. In various embodiments, the data associated with the one or more processes includes at least one of an input data set or an output data set for the one or more processes. In various embodiments, the executed data quality rules may be executed on multiple different data sets.

For example, the executed data quality rules may be executed on the output data set for each of the one or more processes.

In various embodiments, the executed data quality rule(s) may be based on the data quality rule ranking. For example, a predetermined number Y of the plurality of data quality rules may be selected as the executed data quality rule(s) and, as such, the top Y data quality rules in the data quality rule ranking may be selected as the executed data quality rule(s).

Referring now to optional Block 318 of FIG. 3B, the method includes causing an execution of the one or more executed data quality rules on data associated with the one or more processes upon execution of the one or more process. As discussed above, the executed data quality rule(s) may be executed on the input data set or the output data set of any of the one or more processes. As such, the executed data quality rule(s) may be executed upon receiving the target data set (e.g., once an output data set for a given process is received, the executed data quality rule is executed).

In various embodiments, one or more of the plurality of data quality rules not included in the executed data quality rules may also be executed on data associated with the one or more processes upon execution of the one or more process. For example, the executed data quality rule(s) may be executed before any other data quality rules (e.g., the executed data quality rule(s) may be preferred, and the other data quality rules may be executed once the system is less congested (e.g., in an instance in which the computing usage is below a threshold value)).

Referring now to optional Block 320 of FIG. 3B, the method includes causing a rendering of information relating to the execution of the one or more executed data quality rules. In various embodiments, the rendering may include information included in the ranking report discussed below in reference to Block 322 (e.g., including the actual ranking report in some instances). The rendering of information relating to the execution of the one or more executed data quality rules may be displayed on an end-point device associated with the network. The rendering may be provided to various users on the network (e.g., network managers, process users, network and/or application developers, and/or the like).

In various embodiments, the system may receive a ranking modification based on the rendering of information relating to the execution of the one or more executed data quality rules. For example, the user may want certain data quality metrics to be higher weighted and/or certain data quality rules to be higher on the data quality rule ranking. As such, the data quality rule ranking may be updated for future processes on the network. In various embodiments, the ranking modification may be used by the ML/AI model(s) to create future data quality rule ranking.

Referring now to optional Block 322 of FIG. 3B, the method includes causing a ranking report to be generated based on the data quality rule ranking. The ranking report includes the data quality rule ranking and the at least one data quality metric. The ranking report may include various information relating to the data quality rule ranking, such as the order of the data quality rules, common data quality metrics, the weight of each data quality metric, the relative score of each data quality rule (e.g., showing how close the data quality rules were to one another in the scoring metrics), any preferred metrics, and/or the like.

In various embodiments, the ranking report may be engageable (e.g., the ranking report may be dynamic to provide specific information relating to the data quality rule ranking). The ranking report may also be displayed via an end-point device that is capable of receiving user inputs, such that the data quality rule ranking may be modified based on said input. For example, a user may view the ranking report and determine that a given data quality metric is weighted too highly and provide an input to adjust the weighting of the data quality metrics. As such, the data quality rule ranking may be changed, and the ranking report may also be updated. Additionally, the ranking report may be updated in an instance in which the data quality rule ranking is updated. For example, the ranking report may be updated to include information relating to additional executions of a data quality rule, a query from a user, and/or the like.

Referring now to optional Block 324 of FIG. 3B, the method includes training and/or updating a machine learning model and/or AI model to determine the data quality ranking. In various embodiments, the method may use any of the components of the ML architecture 200 shown and discussed above in reference to FIG. 2 to train and/or update the ML/AI model(s).

In various embodiments, the ML/AI model(s) may be trained using historical data relating to data quality rules (e.g., prior executions of the data quality rules on other data sets) and/or using the results of the operations herein (e.g., the operations may be used to update the ML/AI model(s)). The ML/AI model(s) are trained to improve determination of data quality rule ranking(s), allowing for the most efficient and effective data quality rules to be used. As such, data can be verified without requiring unnecessary data quality rules to be executed, making the network faster. The ML/AI model(s) may be trained using a training set including previous network operations including various data quality rules. In various embodiments, the ML/AI model(s) may also be used in other operations herein. For example, a machine learning model may be used to predict the data quality rules for one or more processes.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for determining data quality during data processing, the system comprising:
    at least one non-transitory storage device containing instructions; and
    at least one processing device coupled to the at least one non-transitory storage device, wherein the at least one processing device, upon execution of the instructions, is configured to:
    receive data quality rule information relating to a plurality of data quality rules executed on a network, wherein the data quality rule information comprises at least one data quality metric for each of the plurality of data quality rules, and wherein the plurality of data quality rules comprises at least a first data quality rule and a second data quality rule, wherein the plurality of data quality rules comprises determining data conflicts from different sources and data uniqueness;
    compare one or more of the at least one data quality metric for each of the plurality of data quality rules, wherein comparing the one or more of the at least one data quality metric comprises comparing one or more common data quality metrics, wherein the at least one data quality metric comprises processing power utilized during execution, data quality rule domain, and data quality rule execution during a set interval, wherein the one or more common data quality metrics comprise a data quality metric type shared by at least a plurality of the plurality of data quality rules, wherein the one or more common data quality metrics comprise a weighting based on a predetermined hierarchy of data quality metrics and a weight input from an end-point device;
    determine a data quality rule ranking for each of the plurality of data quality rules based on the comparison of one or more of the at least one data quality metric using a learn to rank machine learning model;
    update the data quality rule ranking based on a predefined update interval and a query received from an end-point device associated with the network;
    receive one or more processes to be executed on the network; and
    determine one or more executed data quality rules of the plurality of data quality rules to be executed on data associated with the one or more processes based on the data quality rule ranking.

2. The system of claim 1, wherein the at least one processing device, upon execution of the instructions, is configured to cause a ranking report to be generated based on the data quality rule ranking, wherein the ranking report comprises the data quality rule ranking and the at least one data quality metric.

3. The system of claim 1, wherein the at least one processing device, upon execution of the instructions, is configured to update the data quality rule ranking based on one or more of the plurality of data quality rules being executed on the network.

4. The system of claim 1, wherein the at least one processing device, upon execution of the instructions, is configured to determine one or more preferred metrics for the one or more processes to be executed on the network, wherein the data quality rule ranking is updated based on the one or more preferred metrics, and wherein the one or more preferred metrics are determined based on the one or more processes to be executed.

5. The system of claim 1, wherein the at least one processing device, upon execution of the instructions, is configured to cause an execution of the one or more executed data quality rules on data associated with the one or more processes upon execution of the one or more processes.

6. The system of claim 5, wherein the at least one processing device, upon execution of the instructions, is configured to cause a rendering of information relating to the execution of the one or more executed data quality rules.

7. A computer program product for determining data quality during data processing, the computer program product comprising at least one non-transitory computer-readable medium having computer-readable program code portions embodied therein, the computer-readable program code portions comprising one or more executable portions configured to:
receive data quality rule information relating to a plurality of data quality rules executed on a network, wherein the data quality rule information comprises at least one data quality metric for each of the plurality of data quality rules, and wherein the plurality of data quality rules comprises at least a first data quality rule and a second data quality rule, wherein the plurality of data quality rules comprises determining data conflicts from different sources and data uniqueness;
compare one or more of the at least one data quality metric for each of the plurality of data quality rules, wherein comparing the one or more of the at least one data quality metric comprises comparing one or more common data quality metrics, wherein the at least one data quality metric comprises processing power utilized during execution, data quality rule domain, and data quality rule execution during a set interval, wherein the one or more common data quality metrics comprise a data quality metric type shared by at least a plurality of the plurality of data quality rules, wherein the one or more common data quality metrics comprise a weighting based on a predetermined hierarchy of data quality metrics and a weight input from an end-point device associated with a user;
determine a data quality rule ranking for each of the plurality of data quality rules based on the comparison of one or more of the at least one data quality metric using a learn to rank machine learning model;
update the data quality rule ranking based on a predefined update interval and a query received from an end-point device associated with the network;
receive one or more processes to be executed on the network; and
determine one or more executed data quality rules of the plurality of data quality rules to be executed on data associated with the one or more processes based on the data quality rule ranking.

8. The computer program product of claim 7, wherein the computer-readable program code portions comprising one or more executable portions are also configured to cause a ranking report to be generated based on the data quality rule ranking, wherein the ranking report comprises the data quality rule ranking and the at least one data quality metric.

9. The computer program product of claim 7, wherein the computer-readable program code portions comprising one or more executable portions are also configured to update the data quality rule ranking based on one or more of the plurality of data quality rules being executed on the network.

10. The computer program product of claim 7, wherein the computer-readable program code portions comprising one or more executable portions are also configured to determine one or more preferred metrics for the one or more processes to be executed on the network, wherein the data quality rule ranking is updated based on the one or more preferred metrics, and wherein the one or more preferred metrics are determined based on the one or more processes to be executed.

11. The computer program product of claim 7, wherein the computer-readable program code portions comprising one or more executable portions are also configured to cause an execution of the one or more executed data quality rules on data associated with the one or more processes upon execution of the one or more processes.

12. The computer program product of claim 11, wherein the computer-readable program code portions comprising one or more executable portions are also configured to cause a rendering of information relating to the execution of the one or more executed data quality rules.

13. A method for determining data quality during data processing, the method comprising:
receiving data quality rule information relating to a plurality of data quality rules executed on a network, wherein the data quality rule information comprises at least one data quality metric for each of the plurality of data quality rules, and wherein the plurality of data quality rules comprises at least a first data quality rule and a second data quality rule, wherein the plurality of data quality rules comprises determining data conflicts from different sources and data uniqueness;
comparing one or more of the at least one data quality metric for each of the plurality of data quality rules, wherein comparing the one or more of the at least one data quality metric comprises comparing one or more common data quality metrics, wherein the at least one data quality metric comprises processing power utilized during execution, data quality rule domain, and data quality rule execution during a set interval, wherein the one or more common data quality metrics comprise a data quality metric type shared by at least a plurality of the plurality of data quality rules, wherein the one or more common data quality metrics comprise a weighting based on a predetermined hierarchy of data quality metrics and a weight input from an end-point device associated with a user;
determining a data quality rule ranking for each of the plurality of data quality rules based on the comparison of one or more of the at least one data quality metric using a learn to rank machine learning model;
updating the data quality rule ranking based on a predefined update interval and a query received from an end-point device associated with the network;
receiving one or more processes to be executed on the network; and determining one or more executed data quality rules of the plurality of data quality rules to be executed on data associated with the one or more processes based on the data quality rule ranking.

14. The method of claim 13, further comprising causing a ranking report to be generated based on the data quality rule ranking, wherein the ranking report comprises the data quality rule ranking and the at least one data quality metric.

15. The method of claim 13, further comprising updating the data quality rule ranking based on one or more of the plurality of data quality rules being executed on the network.

16. The method of claim 13, further comprising determining one or more preferred metrics for the one or more processes to be executed on the network, wherein the data quality rule ranking is updated based on the one or more preferred metrics, and wherein the one or more preferred metrics are determined based on the one or more processes to be executed.

17. The method of claim 13, further comprising:
causing an execution of the one or more executed data quality rules on data associated with the one or more processes upon execution of the one or more processes; and
causing a rendering of information relating to the execution of the one or more executed data quality rules.

* * * * *